A. C. KLENKE.
TOY VEHICLE.
APPLICATION FILED APR. 20, 1920.

1,372,623. Patented Mar. 22, 1921.

INVENTOR
AUGUST C. KLENKE
BY Bradley L. Benson
ATTORNEY.

UNITED STATES PATENT OFFICE.

AUGUST C. KLENKE, OF SAN FRANCISCO, CALIFORNIA.

TOY VEHICLE.

1,372,623.  Specification of Letters Patent.  Patented Mar. 22, 1921.

Application filed April 20, 1920. Serial No. 376,412.

*To all whom it may concern:*

Be it known that I, AUGUST C. KLENKE, a citizen of the United States, residing at San Francisco, in the county of San Francisco and State of California, have invented certain new and useful Improvements in Toy Vehicles, of which the following is a specification.

This invention relates to a new, novel and useful improvement in child's vehicles.

The principal object of this invention is to produce a vehicle which is cheap to construct, sturdy and neat in appearance.

Another object is to provide a vehicle for a child wherein the vibration due to travel over rough surfaces will be lessened, thereby obviating shock to the tender spine of a young child.

Another object is to provide a vehicle which may be disassembled for shipping.

Other objects and advantages of this invention will be seen as the description proceeds.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatsoever form it may be embodied.

In the drawings:—

Referring to the drawings, like numerals correspond to like parts in the different views.

Figure 1:
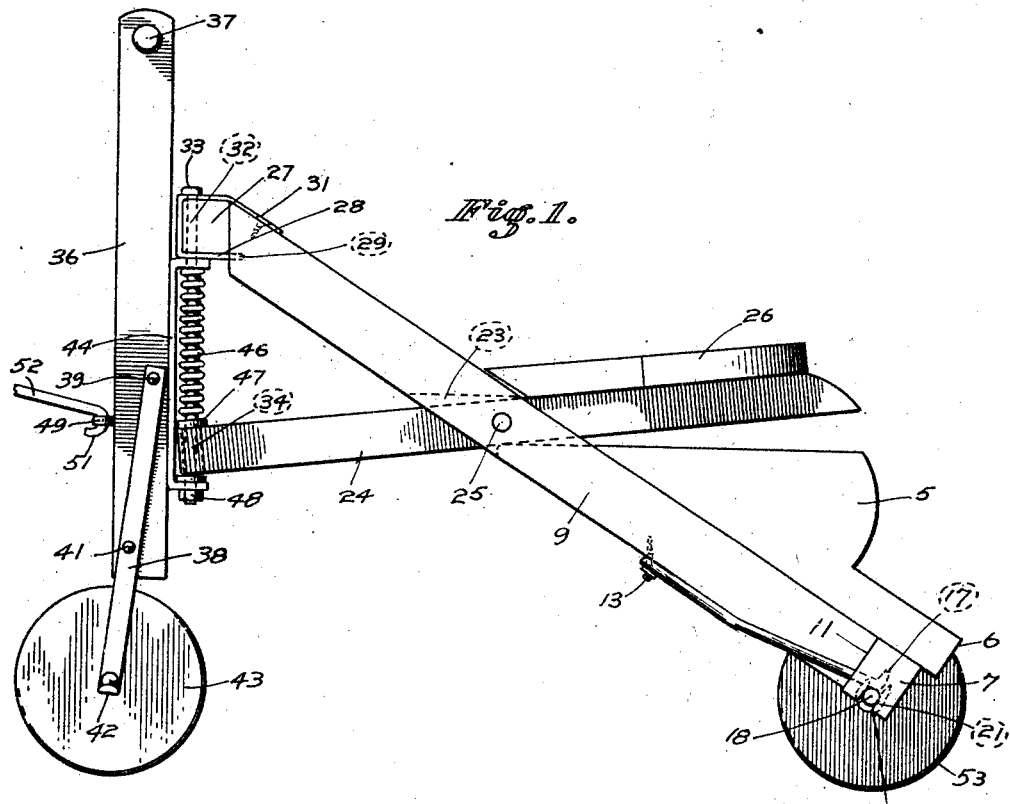
Figure 1 is a side elevation of my vehicle with one of the rear wheels removed.
Figure 2:
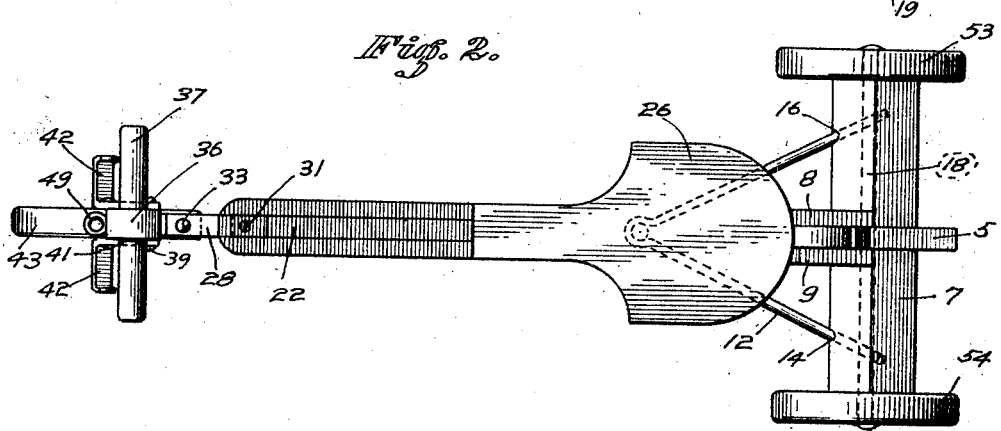
Fig. 2 is a top plan view of my vehicle.

The numeral 5 designates a block having an extension 6 which is adapted to overlap a cross member 7. Side members 8 and 9 are provided, which side members are attached to the block 5 and have their rear ends abutting the cross member 7, as shown at 11. To provide against side strain of the member 7, I provide a bent metal tie member 12 of substantially V-shaped form, as best shown in Fig. 2. This member 12 is attached to the member 5 by a screw 13 and extends rearwardly, entering recesses 14 and 16 in the member 7, and having its ends bent upwardly, as shown in dotted lines at 17. These bent ends are embedded in the member 7, and are held in place by an axle 18 extending through a slot 19 in the member 7. This axle in turn is held in place by a staple 21, the result being that a very rigid brace is formed and in a very simple manner.

A block 22 is secured between the upper ends of the side pieces 8 and 9, said block 22 being spaced from the block 5 so as to provide an opening 23 for a seat bar 24 pivoted at 25 and carrying a seat 26. The block 22 is formed at its upper end with a head 27 around which I form a metal strip 28 having one end countersunk, as shown at 29, and having its free end fastened by a single screw at 31. By providing a longitudinal opening 32 through the head 27 and metal member 28, I provide a passage for a king bolt 33. I also provide an opening 34 in the extremity of the seat bar 24, the seat bar being of such a length that the opening 34 will lie below the opening 32 in the head 27.

The numeral 36 designates a steering post having a steering handle 37 of a convenient height, and is provided at its lower ends with inclined straps 38 riveted to the steering post by suitable rivets, as shown at 39 and 41. These straps are bent, as shown at 42, for the purpose of forming foot rests for the rider. Between these straps 38, I mount a steering wheel 43. The steering post 36 carries at its rear edge a U-shaped member 44 having openings in its ends which openings are adapted to allow the king bolt 33 to pass therethrough.

In assembling, I pass the king bolt 33 through the head 27, upper end of the U-shaped member 44, through a spring 46, a washer 47, seat bar 24 and lower portion of U-shaped member 44, and I secure this king bolt at its lower end from accidental withdrawal by a nut 48. To the forward edge of the steering post 36, I attach a ring 49 for the reception of the hook end 51 of a pulling bar 52. The numerals 53 and 54 refer to the rear wheels mounted upon the axle 19, which completes my vehicle.

It will be noted that by this construction I have provided a child's vehicle wherein the seat is spring mounted, thereby removing the road shock from the child's spine, which is injurious, as is well known. It is also to be noted that I have formed a tie for bracing the cross member 7, said tie being held in place by the usual axle, and but one screw, namely, the screw 13, being employed to assemble the tie.

Having thus described my invention what I claim as new and desire to secure by Letters Patent of the United States is as follows:—

1. In a vehicle, a block, side members attached to said block, a cross member, an axle carried by said cross member, a V-shaped tie attached to said cross member by said axle, and to said block by a single screw, a seat bar pivotally mounted between said side members, a seat carried at the rear end of said bar, a block mounted at the upper ends of said side members, said block being formed with a head, a steering post, a U-shaped member attached to said steering post, a king bolt passing through said head, said U-shaped member, the forward end of said seat bar, and a spring mounted between the upper surface of said seat bar and said head, said spring surrounding said king bolt.

2. In a vehicle, a block, side members attached to said block, a cross member, an axle carried by said cross member, wheels mounted on the outer end of said axle, a tie secured to said cross member by said axle, and to said block at a point forward of said axle, a second block mounted between the upper ends of said side members, said block having a head, a bent member having one end countersunk in said head, said member surrounding said head and having its free end attached by a single screw, an opening through said head and said bent member, a seat member pivoted between said side members, and having its forward end extending to a point beneath said head, a steering post pivotally secured to said head and said seat bar, and a spring mounted between the said head and said seat bar.

In testimony whereof I affix my signature.

AUGUST C. KLENKE.